(12) United States Patent
Harris et al.

(10) Patent No.: US 6,871,074 B2
(45) Date of Patent: Mar. 22, 2005

(54) METHOD AND APPARATUS FOR DATA TRANSMISSION WITHIN A COMMUNICATION SYSTEM

(75) Inventors: John M. Harris, Chicago, IL (US); Philip J. Fleming, Glen Ellyn, IL (US); Yiannis Argyropoulos, East Lansing, MI (US)

(73) Assignee: Motorola, Inc., Schaumburg, IL (US)

( * ) Notice: Subject to any disclaimer, the term of this patent is extended or adjusted under 35 U.S.C. 154(b) by 396 days.

(21) Appl. No.: 10/057,365

(22) Filed: Jan. 25, 2002

(65) Prior Publication Data

US 2003/0143959 A1 Jul. 31, 2003

(51) Int. Cl.$^7$ ................................................ H04Q 7/20
(52) U.S. Cl. ...................... 455/452.1; 455/453; 455/450
(58) Field of Search ............................. 455/450, 451, 455/452.1, 453, 509, 512, 574, 343.1, 343.2, 343.4, 528

(56) References Cited

U.S. PATENT DOCUMENTS

| | | | |
|---|---|---|---|
| 6,442,652 B1 | * | 8/2002 | Laboy et al. ................. 711/138 |
| 6,529,497 B1 | * | 3/2003 | Hjelm et al. ................. 370/347 |
| 2002/0132586 A1 | * | 9/2002 | Chen et al. ..................... 455/69 |
| 2002/0172178 A1 | | 11/2002 | Suzuki et al. |
| 2002/0198012 A1 | * | 12/2002 | Vukovic et al. .............. 455/509 |

FOREIGN PATENT DOCUMENTS

| | | |
|---|---|---|
| DE | 198 45 071 A1 | 4/2000 |
| EP | 0 830 040 A2 | 3/1998 |
| WO | WO 96/37079 A1 | 11/1996 |
| WO | WO 00/01173 A1 | 1/2000 |
| WO | WO 01/20930 A1 | 3/2001 |

OTHER PUBLICATIONS

Keshav, Srinivasan et al. "An Empirical Evaluation of Virtual Circuit Holding Time Policies in IP–Over–ATM Networks." IEEE Journal on Selected Areas of Communications, vol. 13, No. 8, Oct. 1995, pp. 1371–1382.

* cited by examiner

*Primary Examiner*—Vivian Chin
*Assistant Examiner*—Minh D Dao
(74) *Attorney, Agent, or Firm*—Kenneth A. Haas; Lalita W. Pace

(57) ABSTRACT

When the user is actively transmitting/receiving or has recently transmitted/received on the RF channel, the user is referred to as being in an "active" state. Typically, if the user is in the active state, and neither sends nor receives data for a timer period greater than a threshold, then the user is transitioned off of the RF channel (e.g. transitioned from active to dormant). Once a transition to the dormant state has occurred, the continued transmission or re-transmission of data over an RF channel can result in a delay in re-accessing the RF channel. In order to address this problem, the idle-timer threshold is dynamically adjusted based on a communication system statistic to increase system performance.

3 Claims, 3 Drawing Sheets

METHOD AND APPARATUS FOR DATA TRANSMISSION WITHIN A COMMUNICATION SYSTEM

FIELD OF THE INVENTION

The present invention relates generally to cellular communication systems and, in particular, to data transmission within a cellular communication system.

BACKGROUND OF THE INVENTION

Communication systems are well known and consist of many types, including land mobile radio, cellular radiotelephone, personal communication systems, and other communication system types. Within a communication system, transmissions are conducted between a transmitting device and a receiving device over a communication resource, commonly referred to as a communication channel. Data transmission within a cdma2000 communication system takes place by assigning the remote unit a data channel (referred to as a radio-frequency, or RF channel) and transmitting data utilizing the RF channel.

When the user is actively transmitting/receiving or has recently transmitted/received on the RF channel, the user is referred to as being in an "active" state. Typically, if the user is in the active state, and neither sends nor receives data for a period of time, then the user is transitioned off of the RF channel (transitioned from active to dormant).

The ability to quickly re-access an RF channel may be limited due to the transition delay from active to dormant state. In other words, once an RF channel is dropped, any subsequent transmission/re-transmission of data over an RF channel can result in delay in re-accessing the RF channel. Therefore, a need exists for a method and apparatus for data transmission within a communication system that minimizes the occurrence of dormant to active transitions and results in more efficient use of the data channel than with prior-art methods.

DETAILED DESCRIPTION OF THE DRAWINGS

In order to address the above-mentioned problem, in the preferred embodiment of the present invention an idle-timer threshold is dynamically adjusted based on a communication system statistic to increase system performance. More particularly, during a data call, the idle-timer threshold is changed in order to increase the probability of not dropping the data call when data remains to be transmitted or will need to be transmitted in the near future.

The present invention encompasses a method for data transmission within a wireless communication system. The method comprises the steps of determining that data transmission needs to take place, determining a communication system statistic, and adjusting an idle-timer threshold based on the communication system statistic. In the preferred embodiment of the present invention a data call is dropped if there exists no data transmission for a period of time greater than the idle-timer threshold.

The present invention additionally encompasses a method for data transmission within a communication system. The method comprises the steps of receiving data to be transmitted, transmitting the data over an RF channel, and detecting a pause in the received data. A time period is determined for the pause in the received data and a communication system statistic is also determined. An idle-timer threshold is then adjusted based on the communication system statistic. The time period for cessation of data is then compared to the idle-timer threshold and transmission of the data is discontinued if the time period is greater than the idle-timer threshold.

The present invention additionally encompasses an apparatus. The apparatus comprises data transmission circuitry for transmitting over an RF channel, and an idle timer coupled to the data transmission circuitry. The idle timer detects a time period that data transmission ceases and determines a communication system statistic. The idle-timer threshold is adjusted based on the communication system statistic. The RF channel is dropped if there exists no data transmission for a period of time greater than the idle-timer threshold.

Figure 1:
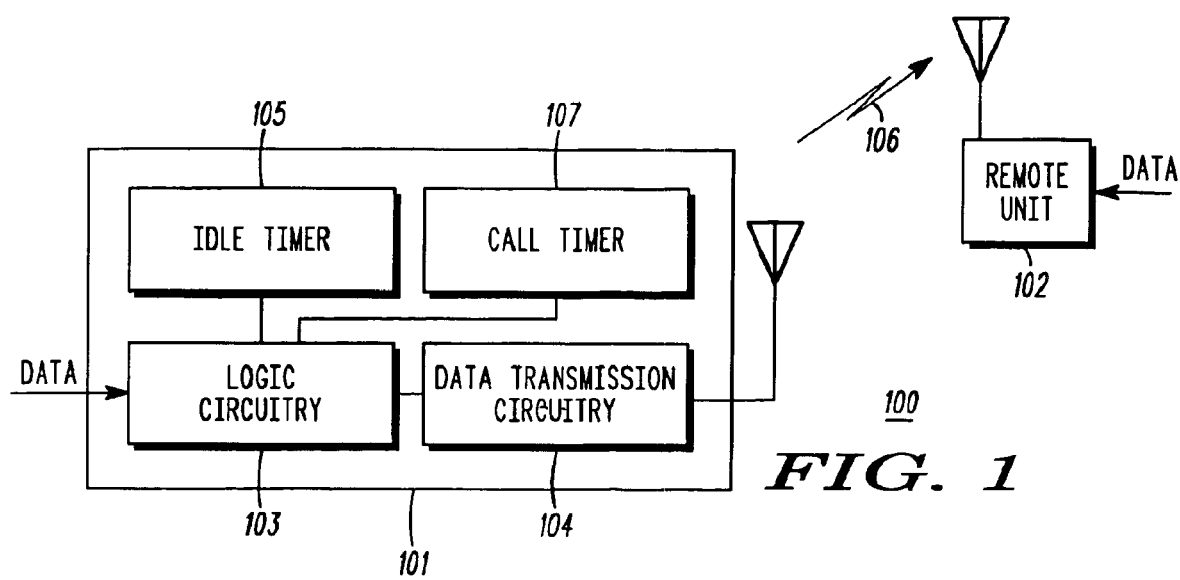
FIG. 1 is a block diagram of a communication system in accordance with the preferred embodiment of the present invention.

FIG. 1 illustrates wireless communication system 100 in accordance with the preferred embodiment of the present invention. In the preferred embodiment of the present invention, communication system 100 utilizes the next generation CDMA architecture as described in the cdma2000 International Telecommunication Union-Radiocommunication (ITU-R) Radio Transmission Technology (RTT) Candidate Submission document (cdma2000), but in alternate embodiments communication system 100 may utilize other analog or digital cellular communication system protocols such as, but not limited to, the next generation Global System for Mobile Communications (GSM) protocol, the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the European Telecommunications Standards Institute (ETSI) Wideband CDMA (W-CDMA) protocol. In the preferred embodiment of the present invention, all network elements are available from Motorola, Inc. (Motorola Inc. is located at 1301 East Algonquin Road, Schaumburg, Ill. 60196). It is contemplated that network elements within communication system 100 are configured in well known manners with processors, memories, instruction sets, and the like, which function in any suitable manner to perform the function set forth herein.

As shown, base station 101 is communicating with remote, or mobile unit 102 via downlink communication signal 106. Additionally, base station 101 comprises idle timer 105, logic circuitry 103, and data transmission circuitry 104, which in the preferred embodiment of the present invention comprises RF channel circuitry as described in cdma2000. Although a single data transmission circuit 104 is shown, one of ordinary skill in the art will recognize that multiple data transmission circuits exist within base station 101.

Data transmission from base station 101 in accordance with the preferred embodiment of the present invention occurs as follows: During time periods where remote unit 102 is not actively communicating to base station 101, remote unit 102 is in a suspended state, actively or periodically monitoring a forward control channel or paging channel (not shown) for notification of any pending transmission by base station 101. While in this suspended state, base station 101 is also waiting for transmission from remote unit 102. In particular, paging channel circuitry is utilized to send messages to remote unit 102 indicating pending downlink transmissions. In the preferred embodiment of the present invention, paging channels circuitry is circuitry such as described in IS-95A Section 7.1.3.4, 7.6.2 and Section 7.7.2.

Data destined to remote unit 102 enters logic circuitry 103, and logic circuitry 103 determines that a transmission to remote unit 102 needs to take place and determines if data transmission circuitry 104 is available for utilization. Remote unit 102 is placed in an active state where it is assigned a traffic, or fundamental channel (not shown). In particular, base station 101 notifies remote unit 102 of spreading codes (Walsh Codes) utilized by the fundamental and RF channels and an assigned data rate of the RF channel. Additionally, initial power control takes place at this point utilizing the fundamental channel as described in IS-95A sections 6.1.2 and 6.6.3.1.1.1.

Once at the appropriate power level, and when an RF channel becomes available, remote unit 102 enters an active state, where communication utilizing the RF channel (i.e., data transmission) occurs.

Transmission on the RF channel may stop, inter alia, for two reasons. A first reason for transitioning to dormant state is because, all data has been communicated to and from remote unit 102. A second reason for transitioning to dormant state is because the time since the last transmission is greater than a threshold. More particularly, once data transmission ceases, idle timer 105 begins to track the time period inactivity. If the time period of inactivity surpasses a threshold (idle-timer threshold), then the RF, or data channel 106 is dropped and remote unit 102 is placed in dormant state.

As discussed above, once a transition to the dormant state has occurred, the continued transmission or re-transmission of data over an RF channel can result in a delay in re-accessing the RF channel. In order to address this problem, the idle-timer threshold is dynamically adjusted based on a communication system statistic. In particular, the idle-timer threshold is dynamically adjusted during data transmission to increase system performance.

Idle Timer Adjusted Based on RF Resources Available

In the preferred embodiment of the present invention, the idle-timer threshold is adjusted based on a level of RF resources available to base station 101. (Examples of RF resources in CDMA 2000 include RF interference capacity, channel elements or data channels available which in GPRS/UMTS include Temporary Block Flow Identifiers). When fewer data channels are available, logic circuitry 103 adjusts the idle-timer threshold downward. Conversely, when there exists sufficient RF resources, logic circuitry 103 increases the idle-timer threshold.

By adjusting the idle-timer threshold as such, a compromise is made between user's occupying data channels needlessly after all data transmission ceases, and using spare resources to improve the user's download. For example, long idle-timer thresholds result in a higher probability that the user will not be dropped prior to competing all downloads, at the cost of potentially keeping the channel occupied after data transmission ceases. The short idle-timer threshold results in a lower potential of keeping a channel occupied after each data transmission ceases at the cost of an increased probability that the user will be moved to dormant state prior to competing all downloads. When system resources are readily available, occupying a channel after data transmission ceases has little impact on system capacity. Therefore, in the preferred embodiment of the present invention, the idle-timer threshold is adjusted upwards in proportion to the amount of system resources available as shown in FIG. 2.

Figure 2:
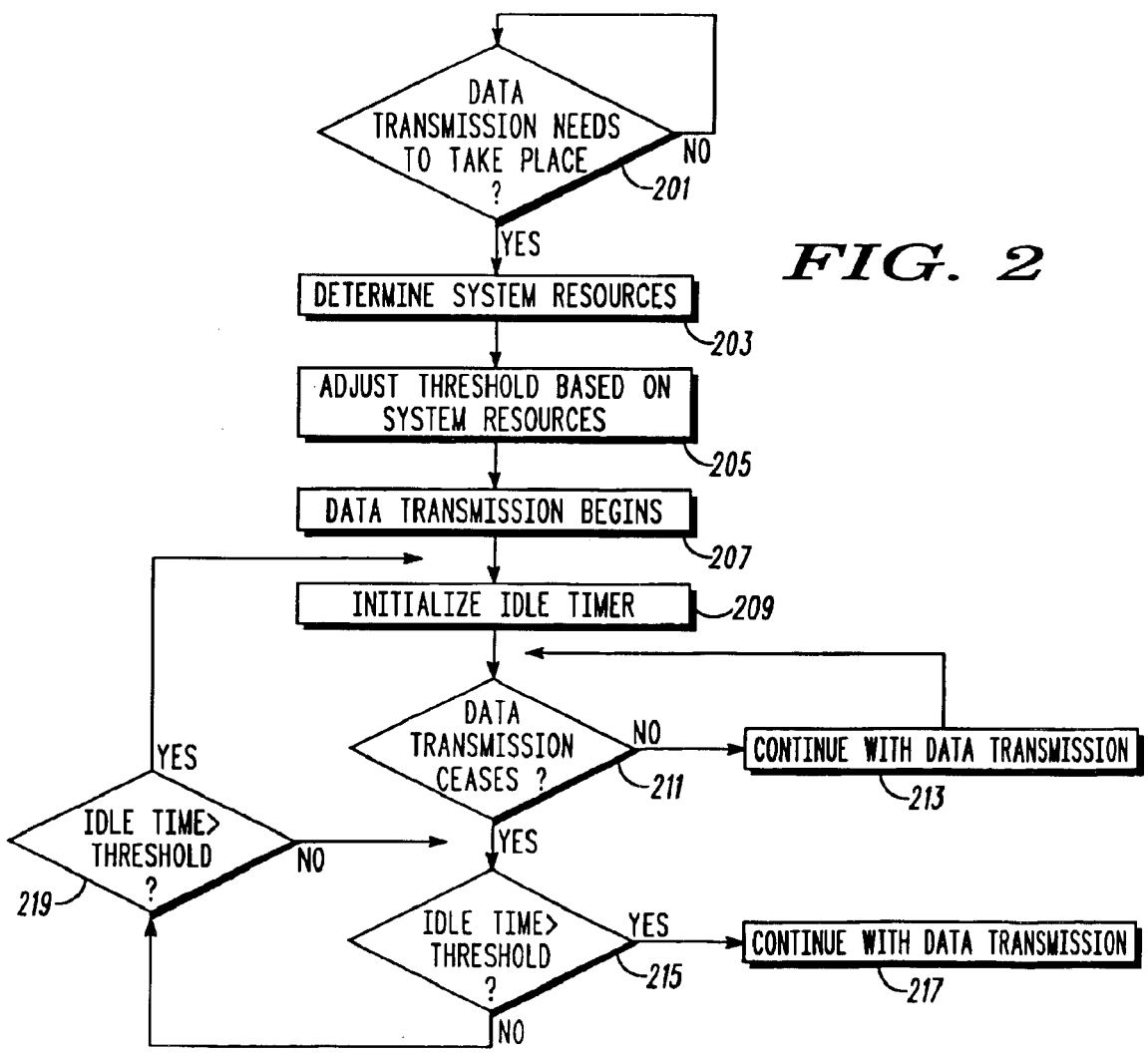
FIG. 2 is a flow chart showing operation of the base station of FIG. 1 in accordance with a first embodiment of the present invention.

FIG. 2 is a flow chart showing operation of base station 101 in accordance with a first embodiment of the present invention. The logic flow begins at step 201 where logic circuitry 103 determines if data transmission needs to take place to remote unit 102. If at step 201 it is determined that data transmission needs to take place, then the logic flow continues to step 203, otherwise the logic flow returns to step 201. At step 203, logic circuitry determines system resources available. In particular, at step 203 a determination is made as to a percentage of RF channels available for utilization. At step 205 logic unit adjusts the idle-timer threshold based upon a percentage of RF channels available for utilization. In the preferred embodiment of the present invention the idle-timer threshold ranges between 5 seconds and 4 minutes and is adjusted as follows: When less than 20% of the RF resources are available, then the idle-timer threshold is set to 5 seconds. When between 20% and 50% of the RF resources are available, then the idle-timer threshold is set to 30 seconds. When more than 50% of the RF resources are available, then the idle-timer threshold is set to 240 seconds.

Continuing, at step 207 data transmission begins and the logic flow continues to step 209 where the idle timer is initialized (set to zero). At step 211, it is determined if data transmission has ceased and if not the logic flow continues to step 213 where data transmission continues. If at step 211 it is determined that data transmission ceases, then the logic flow continues to step 215 where it is determined if the idle time has exceeded the idle-timer threshold, and if so, the data channel is dropped at step 217. More particularly, upon the ceasing of data transmission, logic unit 103 initiates idle timer 105 to begin tracking the amount of time since the last data transmission. If it is determined that the time since the last data transmission is greater than the idle-timer threshold, then the data channel is dropped (the user is transitioned to dormant state). It should be noted that in the preferred embodiment of the present invention the determination that data transmission has ceased is based on whether or not downlink data transmission has stopped, however in an alternate embodiment, data transmission may be determined as stopping when both uplink and downlink data fails to be transmitted over the RF channel.

Continuing, if, at step 215, it is determined that the idle time has not exceeded the idle-timer threshold then the logic flow continues to step 219 where it is determined the if data transmission has resumed. If the data transmission has resumed, then the idle timer is re-initialized (step 209) and the logic flow continues to step 211, otherwise the logic flow simply returns to step 215.

As discussed above, once an RF channel is dropped, the continued transmission/re-transmission of data over an RF channel can result in a time consuming procedure of re-accessing an RF channel. By adjusting the idle-timer threshold based on available system resources, a more efficient use of the data channel is achieved in that the data channel's probability of being needlessly dropped when system resources are readily available is greatly reduced.

Idle-Timer Threshold Based on Length of Call

The length of data calls is generally found to have a decreasing hazard rate. In practical terms, this means that the longer a data call (e.g. active interval or PPP session) has lasted thus far, the longer it is expected to last in the future. As a result of this decreasing hazard rate of call length, in the preferred embodiment of the present invention when the active interval length thus far is shorter, a shorter idle-timer threshold is used. Conversely, when active interval length thus far is longer, a longer idle-timer threshold is used. This is illustrated in FIG. 3.

Figure 3:
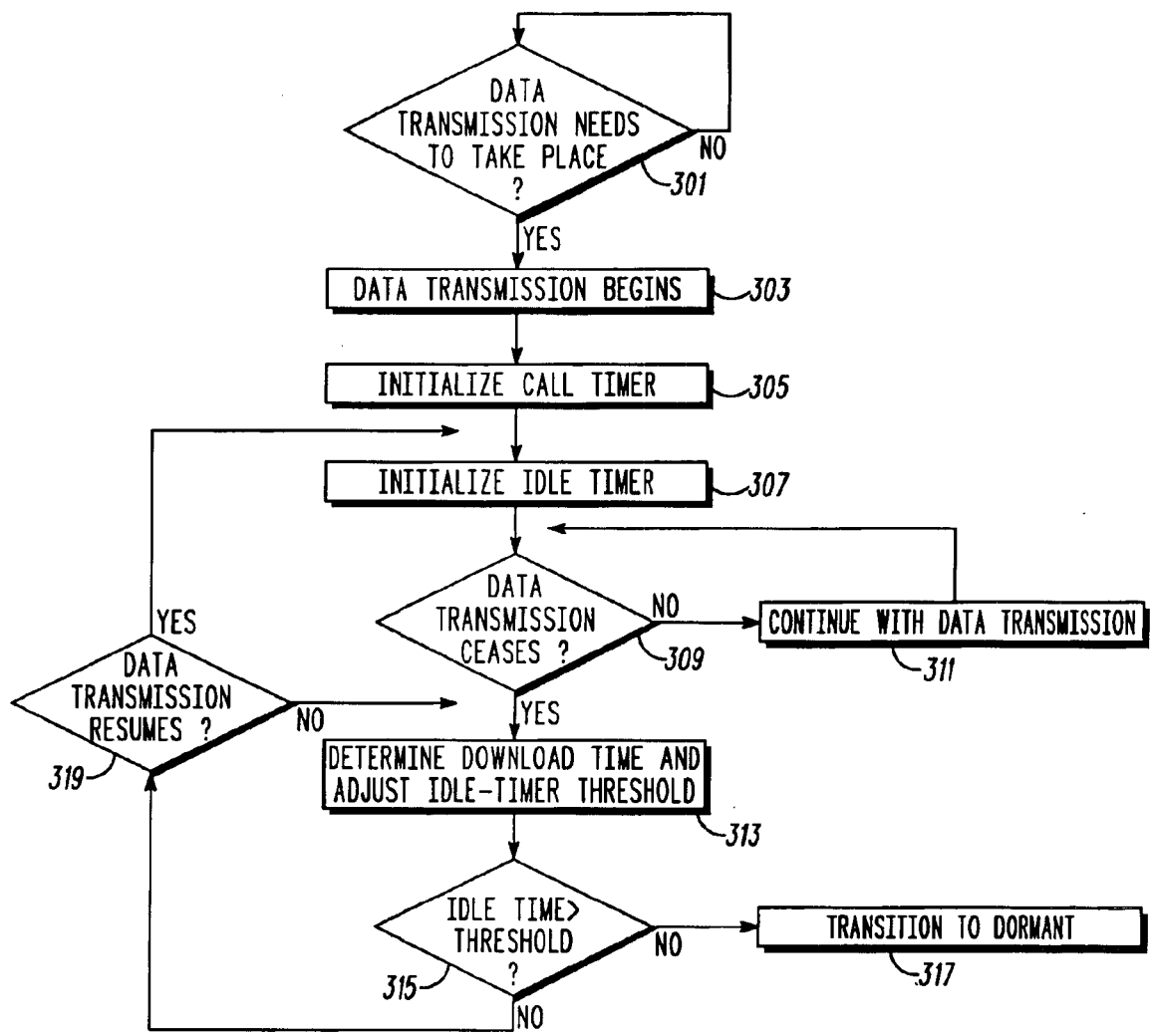
FIG. 3 is a flow chart showing operation of the base station of FIG. 1 in accordance with a second embodiment of the present invention.

FIG. 3 is a flow chart showing operation of base station 101 in accordance with a second embodiment of the present invention. The logic flow begins at step 301 where logic circuitry 103 determines if data transmission needs to take place to remote unit 102. If at step 301, it is determined that data transmission needs to take place, then the logic flow continues to step 303, otherwise the logic flow returns to step 301. At step 303, data transmission begins and the logic flow continues to step 305 and 307 where the call timer 107 and idle timer is initialized (set to zero), respectively. At step 309 it is determined if data transmission has ceased and if not the logic flow continues to step 311 where data transmission continues. If at step 309 it is determined that data transmission ceases, then the logic flow continues to step 313 where logic circuitry 103 accesses a call timer 107 to determine call length so far (total call time ths far), and adjusts idle-timer threshold accordingly. For example, in the case where the amount of RF resources available is constant, for the first minute of the call the idle-timer threshold is set to 30 seconds. If the call has lasted between 1 and 5 minutes the idle-timer threshold is set to 1 minute. After 5 minutes of call length, the idle-timer threshold is set to 2 minutes.

Continuing, at step 315 it is determined if the idle time has exceeded the idle-timer threshold, and if so, the data channel is dropped 317. However, if at step 315 it is determined that the idle time has not exceeded the idle-timer threshold, then the logic flow continues to step 319 where it is determined if data transmission has resumed. If the data transmission has resumed, then the idle timer is re-initialized (step 307) and the logic flow continues to step 309, otherwise the logic flow simply returns to step 313.

As discussed above, once an RF channel is dropped, the continued transmission/re-transmission of data over an RF channel can result in a delay in re-accessing an RF channel. By adjusting the idle-timer threshold based on call length, a more efficient use of the data channel is achieved in that the data channel's probability of being needlessly dropped when data remains to be transmitted is greatly reduced.

Idle-Timer Threshold Based on Link Speed

The length of data calls are generally found to be positively correlated with the downlink data rate. In practical terms, this means that calls with higher data rate downloads typically last longer than calls with lower data rate downloads (possibly because the user has the capability of using a wider variety applications). As a result, in the preferred embodiment of the present invention, when download data rates are low, a shorter idle-timer threshold is used. Conversely, when download data rates are high, a longer idle-timer threshold is used. This is illustrated in FIG. 4.

Figure 4:
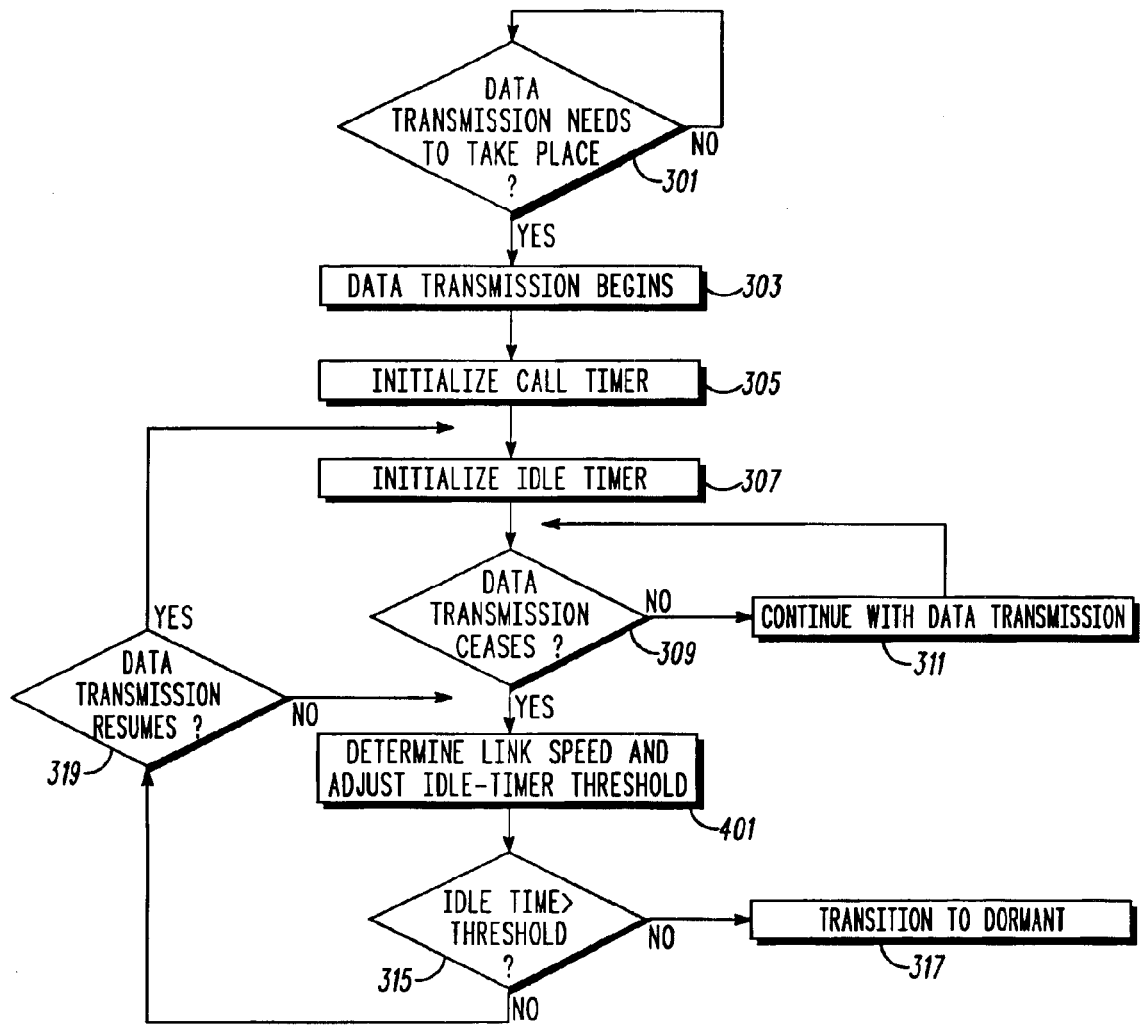
FIG. 4 is a flow chart showing operation of the base station of FIG. 1 in accordance with a third embodiment of the present invention.

FIG. 4 is a flow chart showing operation of base station 101 in accordance with a third embodiment of the present invention. As discussed above, in the third embodiment of the present invention the idle-timer threshold is adjusted based on link speed. The logic flow is similar to that described above with FIG. 3, except that step 313 has been replaced by step 401. In particular, at step 401, logic circuitry 103 determines a current or recent maximum downlink speed (e.g., 100 Kb/sec) and adjusts the idle timer threshold accordingly. The idle-timer threshold is adjusted in the case where the amount of RF resources available is constant, as follows: After two minutes of call have elapsed, the idle-timer threshold is set to 30 seconds if the max link speed achieved is less than 9 Kbps. If the link speed achieved is between 9 Kbps and 50 kbps the idle-timer threshold is set to one minute. If link speed is above 50 kbps, then the idle-timer threshold is adjusted to two minutes.

While the invention has been particularly shown and described with reference to a particular embodiment, it will be understood by those skilled in the art that various changes in form and details may be made therein without departing from the spirit and scope of the invention. For example, although the preferred embodiment of the present invention was described within a cdma2000 system, one of ordinary skill in the art will recognize that any communication system may implement the above procedures. Additionally, although the above description was given with respect to cellular infrastructure adjusting idle-timer thresholds, one of ordinary skill in the art will recognize that mobile, or remote units may adjust idle-timer thresholds as discussed above. It is intended that such changes come within the scope of the following claims.

What is claimed is:

1. A method for data transmission within a wireless communication system, the method comprising the steps of:

determining that data transmission to a remote unit needs to take place;

determining one of a length of time that a current data transmission call of a remote unit has taken place and a link speed for a current data transmission call of a remote unit; and adjusting an idle-timer threshold based on the one of a length of time that the current data transmission call of the remote unit has taken place and the link speed for the current data transmission call of the remote unit, wherein the current data transmission call is dropped if there exists no data transmission for a period of time greater than the idle-timer threshold.

2. A method for data transmission within a communication system, the method comprising the steps of:

receiving data to be transmitted;

transmitting the data over an RF channel to a remote unit;

detecting a pause in the received data;

determining a time period for the pause in the received data;

determining one of a length of time that a current data transmission call of a remote unit has taken place and a link speed for a current data transmission call of a remote unit;

adjusting an idle-timer threshold based on the one of a length of time that the current data transmission call of the remote unit has taken place and the link speed for the current data transmission call of the remote unit;

comparing the time period to the idle-timer threshold; and discontinuing transmission of the data if the time period is greater than the idle-timer threshold, otherwise continuing to transmit the data over the RF channel.

3. An apparatus comprising:

data transmission circuitry for transmitting over an RF channel to a remote unit; and an idle timer coupled to the data transmission circuitry, the idle timer detecting a time period that data transmission ceases; determines one of a length of time that a current data transmission call of a remote unit has taken place and a link speed for a current data transmission call of the remote unit, and adjusting an idle-timer threshold based on the one of a length of time that the current data transmission call of the remote unit has taken place and the link speed for the current data transmission call of the remote unit, wherein an RF channel is dropped if there exists no data transmission for a period of time greater than the idle-timer threshold.

* * * * *